United States Patent [19]

Raden

[11] 4,080,343

[45] Mar. 21, 1978

[54] POLYURETHANE CATALYST

[75] Inventor: Daniel S. Raden, Mount Prospect, Ill.

[73] Assignee: Abbott Laboratories, North Chicago, Ill.

[21] Appl. No.: 725,229

[22] Filed: Sep. 22, 1976

[51] Int. Cl.² ............. C08G 18/14; C08G 18/18; C08G 18/24

[52] U.S. Cl. ............. 260/2.5 AC; 260/77.5 AC; 260/75 NC

[58] Field of Search ............ 260/2.5 AC, 77.5 AC, 260/75 NC

[56] References Cited

U.S. PATENT DOCUMENTS

| | | |
|---|---|---|
| 3,136,731 | 6/1964 | Piechota .................. 260/2.5 AC |
| 3,179,627 | 4/1965 | Twitchett .................. 260/2.5 AC |
| 3,714,080 | 1/1973 | Dahm ...................... 260/2.5 AH |
| 3,993,606 | 11/1976 | von Bonin ............... 260/2.5 AC |

FOREIGN PATENT DOCUMENTS

| | | | |
|---|---|---|---|
| 1,237,777 | 3/1967 | Germany ................. 260/2.5 AC |
| 1,211,405 | 11/1970 | United Kingdom ..... 260/2.5 AC |

*Primary Examiner*—C. Warren Ivy
*Attorney, Agent, or Firm*—Paul D. Burgauer; Robert L. Niblack

[57] ABSTRACT

The use of catalytic amounts of pentamethyldipropylenetriamine promotes the formation of urethane links. Its unusual activity and properties makes the new compound very useful in the manufacture of flexible and rigid polyurethanes.

8 Claims, No Drawings

POLYURETHANE CATALYST

DETAILED DESCRIPTION OF THE INVENTION

Polyurethanes have been finding wider and wider industrial use. It has been learned that the two major components needed to make the urethane polymers, the polyisocyanate and the polyhydroxy compound, are not the only materials that affect the ultimate physical properties of the polymer. These properties, appearance, odor etc. are also often affected by the calalyst used for the polymerization reaction.

Many of the catalysts used today are tertiary monoamines. Among these are N,N,N',N'-tetramethylethylenediamine, triethylamine, N,N-dimethylcyclohexylamine and N-methylmorpholine which have proven useful alone or in mixtures with one another or other catalysts. However, use of these materials has been reduced somewhat because of their low vapor-pressure and the unpleasant odors which are the result thereof. Such tertiary amines produce objectionable odors in the formulated foam as well as in the laboratory or plant.

It has now been found that excellent catalytic results for urethane polymerizations can be obtained by the use of a tri-tertiary amine catalyst.

The current invention is thus directed to the process of preparing urethanes by using N,N,N',N',N"-pentamethyldipropylene triamine (hereinafter referred to as PDT) at levels of between 0.02 and 4.0% by weight of said polyol.

The PDT can be made by the method of Marxer and Miescher [Helv. Chim. Acta, 34, 927 (1951)]. The new catalyst performs like most other polyurethane catalysts but has a number of advantages over many of them: It is a relatively inexpensive material; only small amounts are required to produce the desired catalytic action; it is practically odorless, and it is easily miscible and compatible with most other additives in polyurethane foam formulations commonly used to achieve special properties, i.e., other amine catalysts, polyols, blowing agents, surfactants, pigments, dyes, etc.

In addition to the enumerated characteristics, the catalyst used in the new formulation produces highly desirable rise and set times: It promotes the urethane reaction at a speed slow enough to assure a substantially uniform and homogeneous foam or cell structure, yet it is fast enough to make its use suitable for use in processing equipment operating on a continuous fashion.

In a general embodiment, the urethane is formed by combining the desired polyol with the new catalyst. In most instances, this mixture is stable and may be stored for extended periods of time; it may also contain other additives often employed in the manufacture of urethane foams, particularly blowing agents, surfactants or other catalysts. However, pigments and/or dyes are preferably not added if this mixture is intended to be stored for some time. Those skilled in the art will be aware that in using certain polyols, additives of any type drastically reduce storability. The mixture is then combined in the usual fashion with the selected polyisocyanate in a batch operation involving preferably a period of agitation from 5-30 sec. or in a continuous operation. This operation is usually carried out at room temperature, but it can be carried out between 0° and 40° C.

In order to illustrate the above general procedure, reference is made to the following specific embodiments which, however, are not meant to limit the invention in any respect.

EXAMPLES 1 AND 2

To a mixture of 50 parts of a polyol (polyoxy propylene polyol of functionality $f = 4.4$; marketed by Dow Chemical Co. as Voranol ® 490), 0.75 parts of a siliconeglycol copolymer surfactant (marketed by Dow-Corning Corp. as DC-195), 18.25 parts of trichlorofluoromethane and the amount of PDT shown below, were added 63.3 parts of a mixture of aromatic polyisocyanates having an average isocyanate content of 31.5% (marketed by Mobay Chemical Co. as Mondur ® MR). This batch was mixed for 10 seconds at 1000 rpm and poured into a one-gallon ice-cream container where it was allowed to rise freely. The process characteristics for the two catalyst levels are given in Table I. In both instances, an odorless rigid foam resulted having physical properties equal or better than foams made with previously known catalysts.

TABLE I

| | Example 1 | Example 2 | |
|---|---|---|---|
| Catalyst Level | 3.2 | 1.6 | parts |
| Final Rise Height | 5.6 | 5.7 | inches |
| Initiation Time | 28 | 45 | seconds |
| Rise Time | 64 | 100 | " |
| Foaming Time | 36 | 55 | " |
| Reactivity Index | 0.56 | 0.55 | — |
| Maximum Rise Rate | 11.8 | 8.4 | inch/min. |
| Time to Maximum Rise Rate | 55 | 78 | seconds |
| Velocity Index | 0.75 | 0.60 | — |
| Specific Rise Rate | 2.11 | 1.47 | min.$^{-1}$ |

When the above catalyst was replaced with 1.6 parts of N,N-dimethylcyclohexylamine (Me$_2$CHA), rise time was 115 seconds, foaming time was 63 seconds, time to maximum rise rate was 95 seconds and the specific rise rate was only 1.35.

EXAMPLES 3 AND 4

Formulations for flexible foams with low and high water content, respectively, were made according to Examples 1 and 2, using the amounts of ingredients listed below. Table II also shows the process characteristics. The polyol used was a polyoxypropylene triol with an average molecular weight of 3000 (marketed by Dow Chemical Co. as Voranol 3000); the surfactant was a non-hydrolyzable silicone copolymer (marketed by Union Carbide Co. as L-540). Other components were the above PDT, stannous octoate (Sn-oct.), and toluene diisocyanate (TDI) at isocyanage index indicated. For reasons of comparison, the same formulations using triethylene diamine as a 33% solution in dipropylene glycol (marketed by Air Products & Chemicals, Inc. as Dabco ® 33 LV) are shown as well. All parts are by weight.

TABLE II

| | | Example 3 | | Example 4 | |
|---|---|---|---|---|---|
| CP 3000 | parts | 100 | 100 | 100 | 100 |
| L-540 | " | 1.4 | 1.4 | 1.2 | 1.2 |
| Water | " | 2.5 | 2.5 | 4.8 | 4.8 |
| 33 LV | " | — | 0.35 | — | 0.30 |
| PDT | " | 0.35 | — | 0.30 | — |

TABLE II-continued

|  |  | Example 3 | | Example 4 | |
|---|---|---|---|---|---|
| Sn-oct | " | 0.28 | 0.28 | 0.27 | 0.27 |
| TDI | index | 105 | 105 | 113 | 113 |
| Final Rise Height | in. | 4.65 | 5.0 | 9.0 | 9.6 |
| Initiation Time | sec. | 23 | 25 | 23 | 24 |
| Rise Time | " | 108 | 125 | 68 | 80 |
| Foaming Time | " | 85 | 100 | 45 | 56 |
| Reactivity Index | — | 0.79 | 0.80 | 0.66 | 0.70 |
| Maximum Rise Rate | in/min | 4.9 | 3.4 | 14.6 | 13.3 |
| Time to Max. Rise Rate | sec. | 40 | 67 | 47 | 42 |
| Velocity Index | — | 0.16 | 0.42 | 0.53 | 0.50 |
| Specific Rise Rate | min.$^{-1}$ | 1.05 | 0.68 | 1.62 | 1.38 |

When using a level of 0.02% of PDT in place of the above 0.3% with 0.2% of Sn-octoate, similar foams as those above were obtained.

EXAMPLES 5-7

In the formulations listed in Table III, various polyols, polyisocyanates, blowing agents and surfactants were processed into rigid foams with the use of the new PDT catalyst. The same formulations were also processed with a conventional catalyst, Me$_2$CHA, and the physical characteristics were compared. The polyols used are the above Voranol 490, Voranol 450 and Voranol 350, both sucrose based polyoxypropylene polyols ($f$ = 8; OH numbers 450 and 350, respectively) and Voranol 360, a polyether polyol (OH number 350-370), all marketed under the given designations by Dow Chemical Co. The surfactants used are similar to those used in Examples 1-2; the blowing agents were CCl$_3$F or water, and a flame retardant, a hydroxy terminated phosphonate ester (marketed by Stauffer Chemical Co. as Fyrol® 6). The polyisocyanates are the aromatic mixture shown above, or polymethylene polyphenylisocyanate, ($f$ = 2.7; average NCO content 31.5%; marketed by Upjohn Co. as PAPI®) at the indices listed below. In one instance, dibutyl tin dilaurate (DBTDL) was used as a co-catalyst. The properties found are shown below after processing the formulations according to Examples 1-2; the dimensions are those used in the preceding examples.

TABLE III

| Example 5 | | Example 6 | | Example 7 | | |
|---|---|---|---|---|---|---|
| RN-490 | 100 | RS-450 | 71.4 | RH-360 | 100 | parts |
| DC-195 | 1.5 | RS-350 | 28.6 | DC-193 | 0.94 | parts |
| CCl$_3$F | 36.5 | Fyrol-6 | 33.9 | Water | 0.625 | parts |
| Mondur MR | 109 | PAPI | 105 | Mondur MR | 102.5 | index |
| Amine |  |  |  | Amine |  |  |
| Catalyst | 1.6 | DC-195 | 3.25 | Catalyst | 0.94 | parts |
|  |  | Amine |  |  |  |  |
|  |  | Catalyst | 1.4 |  |  | parts |
|  |  | DBTDL | 0.325 |  |  | parts |
|  |  | CCl$_3$F | 45.6 |  |  | parts |
| PDT | Me$_2$CHA | PDT | Me$_2$CHA | PDT | Me$_2$CHA | Catalyst |
| 50 | 55 | 18 | 25 | 60 | 70 | Cream Time |
| 160 | 180 | 150 | 225 | 240 | 240 | Rise Time |
| 155 | 180 | 160 | 285 | — | — | Tack free time |
| 2.0 | 2.2 | 1.8 | 1.9 | 9.3 | 9.1 | Density |
| 46 | 48 | 26 | 28 | 5.5 | 7.1 | Friability |

From the above results it will be apparent that with very small amounts of the new catalyst, excellent results are being accomplished. In all instances where PDT is used as the catalyst, the formed urethane foam has physical properties substantially the same as when older catalysts are used; however, PDT has the advantage over older catalysts that the foam is free of amine odors as a whole or on a freshly cut surface. This is the case at PDT levels up to 4% by weight of the amount of the polyol used. In most previously known catalysts, only smaller catalyst levels produce odorless cutting surfaces. The new catalyst performs well in the presence or absence of other catalysts and/or blowing agents and may be used equally well in formulation designed for rigid, semi-rigid or flexible foams.

While more than 4% PDT could be used, no advantage is gained thereby, since from the combined catalytic and economical viewpoint, amounts of 0.5-2% produce excellent results.

As well known by those skilled in the art, flexible foams ordinarily are made in the presence of an organic tin compound. Such tin compounds are well known in the art, i.e. fatty acid tin salts such as stannous octoate, stannous oleate, stannous acetate and the like. Other foam formulations use tetravalent tin salts such as dibutyl tin dilaurate. Usually, tin catalysts are used in amounts of 0.05 to 1.5% by weight based on the weight of the polyol used.

Numerous blowing agents are also well known in the art and are used at various amounts depending on the cell size desired in the final product. The most economical of such agents is water, but frequently halogenated short chained alkanes carrying chlorine and/or fluorine are used alone or in combination with water. Blowing agents are often used in amounts ranging up to 50% of the weight of the polyol.

What is claimed is:

1. The process of preparing a urethane consisting essentially in carrying out the polymerization reaction between a polyol and a polyisocyanate in the presence of N,N,N',N',N"-pentamethyldipropylene triamine, said triamine being used in an amount of between 0.02 and 4.0% by weight of said polyol.

2. The process of claim 1 wherein said triamine is used in an amount of 0.5 and 2.0%.

3. The process of claim 1 wherein said reaction mixture also contains a blowing agent.

4. The process of claim 3 wherein said blowing agent is water.

5. The process of claim 3 wherein said blowing agent is $CCl_3F$.

6. The process of claim 1 for making a urethane which uses, as a co-catalyst, an organic tin compound.

7. The process of claim 6 wherein said tin compound is dibutyl tin dilaurate.

8. The process of claim 6 where in said tin compound is a stannous diacylate.

* * * * *